United States Patent
Boesl

(10) Patent No.: US 12,441,309 B2
(45) Date of Patent: Oct. 14, 2025

(54) METHOD AND DRIVER ASSISTANCE DEVICE FOR ASSISTANCE IN THE PERFORMANCE OF A RETURN DRIVING MANEUVER

(71) Applicant: Bayerische Motoren Werke Aktiengesellschaft, Munich (DE)

(72) Inventor: Andreas Boesl, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/898,845

(22) Filed: Sep. 27, 2024

(65) Prior Publication Data

US 2025/0108798 A1    Apr. 3, 2025

(30) Foreign Application Priority Data

Sep. 28, 2023   (DE) ...................... 10 2023 126 551.2

(51) Int. Cl.
| | |
|---|---|
| *B60W 60/00* | (2020.01) |
| *B60W 30/10* | (2006.01) |
| *B60W 50/14* | (2020.01) |

(52) U.S. Cl.
CPC ............ *B60W 30/10* (2013.01); *B60W 50/14* (2013.01); *B60W 60/001* (2020.02)

(58) Field of Classification Search
CPC .............. B62D 15/0285; B60W 30/06; B60W 30/18036; B60W 30/18045
See application file for complete search history.

(56) References Cited

U.S. PATENT DOCUMENTS

| | | | |
|---|---|---|---|
| 2019/0256141 A1* | 8/2019 | Stroebel | ............ B62D 15/0285 |
| 2022/0274586 A1 | 9/2022 | Tokuhiro et al. | |
| 2022/0287218 A1* | 9/2022 | Yuasa | .................... B60K 31/00 |

FOREIGN PATENT DOCUMENTS

| | | |
|---|---|---|
| DE | 10 2014 018 192 A1 | 6/2015 |
| DE | 10 2016 117 743 A1 | 3/2018 |
| DE | 10 2018 114 497 A1 | 12/2019 |

(Continued)

OTHER PUBLICATIONS

Dana translation (Year: 2023).*

(Continued)

*Primary Examiner* — Kenneth J Malkowski
(74) *Attorney, Agent, or Firm* — Crowell & Moring LLP

(57) ABSTRACT

A driver assistance device for assistance in performing a return driving maneuver of a motor vehicle based on a recorded outward driving maneuver is configured to detect that the motor vehicle has deviated from the driving trajectory of the return driving maneuver and is now arranged at a surrounding position in the surroundings of the driving trajectory of the return driving maneuver. The driver assistance device checks at the surrounding position whether the motor vehicle can be returned in an automated manner on the driving trajectory of the return driving maneuver proceeding from the surrounding position, and outputs an offer for an automated performance of the recorded driving maneuver at the surrounding position if it is ascertained that the motor vehicle can be returned from the surrounding position in an automated manner on the driving trajectory of the return driving maneuver.

11 Claims, 4 Drawing Sheets

(56) References Cited

FOREIGN PATENT DOCUMENTS

DE   10 2022 102 697 A1   9/2022
WO   WO-2023139185 A1 *   7/2023   ............ B60W 30/06

OTHER PUBLICATIONS

German-language Search Report issued in German Application No. 10 2023 126 551.2 dated Jul. 12, 2024 with partial English translation (11 pages).
Office Action for German Application No. DE 10 2023 126 551.2 dated Dec. 10, 2024 (English Translation) (4 pp.).

* cited by examiner

METHOD AND DRIVER ASSISTANCE DEVICE FOR ASSISTANCE IN THE PERFORMANCE OF A RETURN DRIVING MANEUVER

CROSS REFERENCE TO RELATED APPLICATION

This application claims priority under 35 U.S.C. § 119 from German Patent Application No. DE 10 2023 126 551.2, filed Sep. 28, 2023, the entire disclosure of which is herein expressly incorporated by reference.

BACKGROUND AND SUMMARY

The invention relates to a method and a corresponding driver assistance device, which are directed to assisting the user of a (motor) vehicle based on a previously recorded outward driving maneuver in the performance of a corresponding return driving maneuver.

A vehicle can have an assistance device, which enables the user of the vehicle to record and store a driving trajectory driven in manual driving operation. The driving trajectory can relate to a parking maneuver of the vehicle, in which the vehicle is driven onto a parking space (in particular a transverse or longitudinal parking space). The recorded and stored driving trajectory can be used at a later point in time for the purpose of guiding the vehicle in an automated manner along the stored driving trajectory to the same parking space or driving it out of the parking space along a trajectory ascertained on the basis of the stored driving trajectory. The convenience of the vehicle with respect to carrying out parking maneuvers can thus be increased.

It can occur that the user begins a driving maneuver (in particular a maneuvering maneuver) already in manual operation and only decides at a later point in time to have the driving maneuver performed in an automated manner.

The present document relates to the technical problem of enabling the most robust possible performance of a previously recorded driving maneuver, in particular to increase the availability and the convenience of a driver assistance device for the repeated performance of recorded driving maneuvers. In particular, the robustness in the performance of a return driving maneuver, which is based on a previously recorded outward driving maneuver, is to be increased.

This object is achieved by the present disclosure. Advantageous embodiments are also described in the present disclosure. It is to be noted that additional features of a claim dependent on an independent claim, without the features of the independent claim or in combination with only a subset of the features of the independent claim, can form a separate invention independent of the combination of all features of the independent claim, which can be made the subject matter of an independent claim, a divisional application, or a subsequent application. This applies in the same manner to technical teachings described in the description, which can form an invention independent of the features of the independent claims.

According to one aspect, a driver assistance device for assistance in the performance of a recorded driving maneuver, in particular a parking maneuver, of a (motor) vehicle is described. The driving maneuver can be intended to guide the vehicle to a specific parking space or guide it away from a specific parking space. The driver assistance device can be designed in particular for assistance in the performance of a return driving maneuver of a motor vehicle based on a corresponding recorded outward driving maneuver.

The driver assistance device can be configured to record a trajectory driven by the vehicle during a performance of an (outward) driving maneuver in a recording mode in order to ascertain a recorded trajectory (and store it in a storage unit of the vehicle). The longitudinal and/or (in particular and) the lateral guidance of the vehicle can be effectuated manually by the driver of the vehicle in the recording mode in the performance of the driving maneuver.

In the context of the recording of the driving trajectory (of the outward driving maneuver), trajectory data can be acquired and recorded. The trajectory data can specify for each of a plurality of points and/or positions along the driving trajectory (starting from a starting position up to an end position of the trajectory, and with a specific spatial resolution, for example, at least 1 point and/or position per 10 cm or per 50 cm or per meter)
- the coordinates of the respective position;
- the orientation and/or alignment of the vehicle at the respective position; and/or
- the driving speed of the vehicle at the respective position.

The trajectory data of the driving trajectory (of the outward driving maneuver) can be stored in the storage unit of the vehicle. Furthermore, the trajectory data can be used in a replay mode (of the driver assistance device) for the purpose of guiding the vehicle in an automated manner (with automated lateral guidance and possibly with automated longitudinal guidance) along a driving trajectory, which is based on the recorded driving trajectory (of the outward driving maneuver). The end position of the recorded driving trajectory can be arranged on a parking space for the vehicle. The starting position can be arranged at the entry of a parking area (such as a parking garage or a parking lot).

The recorded and stored driving trajectory of a recorded outward driving maneuver can therefore be used to guide the vehicle in the reverse direction with automated lateral guidance (and possibly with automated longitudinal guidance) from the end position to the starting position. The driving trajectory, in particular the trajectory data, of the recorded outward driving maneuver can therefore be used for an automated return journey of the vehicle.

The recorded (outward) driving maneuver can therefore comprise an outward journey from a starting position to an end position. The outward journey can possibly be carried out in the forward direction of the motor vehicle. Carrying out the return driving maneuver corresponding to the recorded outward driving maneuver in an automated manner can comprise a return journey from the end position to the starting position. The return journey can possibly be carried out in the reverse direction of the motor vehicle. The driver assistance device can be configured to ascertain the driving trajectory for the return driving maneuver on the basis of the driving trajectory recorded for the outward driving maneuver and/or on the basis of the driving trajectory recorded during the outward driving maneuver. At least the end position of the outward driving maneuver can be arranged on the driving trajectory of the return driving maneuver here. The end position of the outward driving maneuver can correspond to the position at which the driving trajectory of the return driving maneuver begins.

It is to be noted that the term "driving trajectory" can define a sequence of positions which are reached or are supposed to be reached in succession in the course of a driving maneuver. A driving trajectory can therefore define a driving path. The term "driving trajectory" can therefore be understood in this document as a driving path. In particular, a driving trajectory can be a driving path.

The driver assistance device is configured to detect that the motor vehicle has deviated from the driving trajectory of the return driving maneuver and is now arranged at a surrounding position in the surroundings of the driving trajectory of the return driving maneuver. For example, the motor vehicle can deviate from the driving trajectory of the return driving maneuver starting from the end position of the outward driving trajectory (at which the driving trajectory of the return driving maneuver begins). It can be recognized on the basis of position data of a GNSS (global navigation satellite system) receiver of the motor vehicle and/or on the basis of the sensor data from one or more surroundings sensors (such as one or more cameras) of the motor vehicle and/or on the basis of odometry data with respect to the odometry of the motor vehicle that the motor vehicle has deviated from the driving trajectory of the return driving maneuver. Furthermore, the position (in particular the distance) of the motor vehicle relative to the driving trajectory of the return driving maneuver can possibly be ascertained.

The longitudinal and lateral guidance of the motor vehicle can have been effectuated manually by the driver of the motor vehicle. Therefore (proceeding from the beginning of the driving trajectory of the return driving maneuver, which typically corresponds to the end position of the outward driving maneuver), a manual journey can have been caused by the driver along a manual trajectory, wherein the manual trajectory has led the motor vehicle away from the driving trajectory of the return driving maneuver.

Alternatively (proceeding from the beginning of the driving trajectory of the return driving maneuver), an automated performance of the return driving maneuver can have been effectuated. The lateral guidance can have been effectuated here in an automated manner by the motor vehicle, while the longitudinal guidance was effectuated by the driver of the motor vehicle. This can have had the result that the motor vehicle has deviated from the driving trajectory of the return driving maneuver.

It can therefore be detected that the motor vehicle is guided along a trajectory proceeding from a position on the driving trajectory of the return driving maneuver (for example, proceeding from the beginning of the driving trajectory of the return driving maneuver) away from the driving trajectory of the return driving maneuver into the surroundings of the driving trajectory of the return driving maneuver (and has therefore deviated from the driving trajectory of the return driving maneuver). This actually driven trajectory of the motor vehicle can have a sequence of surrounding positions (wherein the individual surrounding positions are each arranged in the surroundings of the driving trajectory of the return driving maneuver). The (actually driven) trajectory can be a manual trajectory. Alternatively, the (actually driven) trajectory can be a trajectory which was effectuated during the automated performance of the return driving maneuver.

The driver assistance device can be configured to ascertain, possibly repeatedly at each of the individual surrounding positions of the sequence of surrounding positions along the (actually driven) trajectory, in particular along the manual trajectory, the distance of the respective surrounding position from the driving trajectory of the return driving maneuver, and to compare the distance to a distance threshold value, for example, to a first distance threshold value and/or to a second distance threshold value. The second distance threshold value can be greater than the first distance threshold value. The first distance threshold value can be, for example, 30 cm or less, for example 15 cm. The second distance threshold value can be 40 cm or more, for example 50 cm.

If the distance is equal to or less than the (second) distance threshold value, it can be determined that the motor vehicle is arranged in the surroundings of the driving trajectory of the return driving maneuver. If the distance is greater than the (second) distance threshold value, it can be determined that the motor vehicle is not (possibly no longer) arranged in the surroundings of the driving trajectory of the return driving maneuver. The distance can be the perpendicular distance of the respective surrounding position from the driving trajectory of the recorded driving maneuver.

If it is recognized that the motor vehicle is no longer arranged in the surroundings of the driving trajectory of the return driving maneuver, the output of an offer for the automated performance of the return driving maneuver can be prevented (fundamentally and/or in general).

The driver assistance device is furthermore configured to check (repeatedly) at the individual surrounding positions of the sequence of surrounding positions along the (actually driven) trajectory, in particular along the manual trajectory, whether or not the motor vehicle can be returned proceeding from the respective surrounding position in an automated manner on the driving trajectory of the return driving maneuver.

In this context, the driver assistance device can be configured to check at the respective surrounding position of the sequence of surrounding positions whether a return trajectory can be ascertained (or not), along which the motor vehicle can be returned in an automated manner from the respective surrounding position on the driving trajectory of the return driving maneuver. It can be checked in particular whether a return trajectory can be ascertained which meets one or more boundary conditions. The one or more boundary conditions can comprise
- a boundary condition to the effect that no object obstructing the motor vehicle is arranged on the return trajectory; and/or
- a boundary condition to the effect that the return trajectory does not deviate at any point from the driving trajectory of the return driving maneuver by more than a maximum permissible distance (in particular perpendicular distance); and/or
- a boundary condition to the effect that the return trajectory does not exceed at any point a maximum curvature, e.g., a maximum permissible, implementable, and/or possible curvature (which can still just be implemented by the steering system of the motor vehicle).

It can be determined that the motor vehicle can be returned in an automated manner on the driving trajectory of the return driving maneuver proceeding from the respective surrounding position if a (valid) return trajectory can be ascertained (which meets the one or more boundary conditions). On the other hand, it can be determined that the motor vehicle cannot be returned in an automated manner on the driving trajectory of the return driving maneuver proceeding from the surrounding position if no (valid) return trajectory can be ascertained (which meets the one or more boundary conditions).

The driver assistance device is furthermore configured to output (in particular to maintain) an offer for an automated performance of the return driving maneuver at the respective surrounding position of the sequence of surrounding positions if it is ascertained that the motor vehicle can be returned in an automated manner on the driving trajectory of the return driving maneuver from the respective surrounding position. The offer for an automated performance of the return driving maneuver can be (continuously) output in particular at the individual surrounding positions of the sequence of surrounding positions as long as it is ascertained that the motor vehicle can be guided in an automated manner from the respective surrounding position on the driving trajectory of the return driving maneuver. On the other hand, the offer for an automated performance of the return driving maneuver can be suppressed from a surrounding position of the sequence of surrounding positions from which it is ascertained that the motor vehicle can no longer be returned in an automated manner on the driving trajectory of the return driving maneuver.

The driver assistance device can therefore be configured (possibly also during a manual journey of the motor vehicle, and/or without explicit activation of the driver assistance by the user of the motor vehicle) to check whether or not an automated return is possible on the driving trajectory of the return driving maneuver. The robustness and the availability of the automated performance of the return driving maneuver can thus be increased.

The driver assistance device can be configured to check repeatedly at the individual surrounding positions of the sequence of surrounding positions along the (actually driven) trajectory, in particular along the manual trajectory, whether the motor vehicle can be returned in an automated manner on the driving trajectory of the return driving maneuver proceeding from the respective surrounding position, in particular along a return trajectory (ascertained in the course of the check)

without a driver assistance previously having been activated to repeatedly perform recorded driving maneuvers; and/or without a user input previously having taken place to activate the repeated check.

The driver of the motor vehicle can possibly have opened a parking panel of the user interface, by which the driver of the motor vehicle indicates that he is fundamentally interested in the automated performance of a previously recorded driving maneuver (or a return driving maneuver derived therefrom). However, no specific selection of a recorded driving maneuver (in particular a return driving maneuver) can have taken place yet.

A repeated check of the automated return of the motor vehicle on the driving trajectory of the return driving maneuver can therefore be effectuated passively in the background. The robustness and the availability of the automated performance of the return driving maneuver can thus be increased in a particularly convenient and reliable manner.

As already described above, the driver assistance device can be configured to ascertain the distance of the respective surrounding position from the driving trajectory of the return driving maneuver repeatedly at each of the individual surrounding positions of the sequence of surrounding positions, and to compare the distance to a (first and/or second) distance threshold value. The offer for an automated performance of the recorded driving maneuver can be suppressed at, in particular from the respective surrounding position at, in particular from which the distance is greater than the (second) distance threshold value. On the other hand, the output of the offer for an automated performance of the recorded driving maneuver can possibly only be enabled when the distance is equal to or less than the (second) distance threshold value. The robustness of the automated performance of the return driving maneuver can thus be further increased.

The driver assistance device can be configured to output an offer for an automated performance of the return driving maneuver at the respective surrounding position of the sequence of surrounding positions if, in particular as long as the distance is equal to or less than the first distance threshold value, without previously checking whether the motor vehicle can be guided proceeding from the respective surrounding position in an automated manner on the driving trajectory of the return driving maneuver.

Alternatively or additionally, the driver assistance device can be configured to suppress the check as to whether the motor vehicle can be returned in an automated manner on the driving trajectory of the return driving maneuver proceeding from the respective surrounding position if, in particular as long as, the distance is equal to or less than the first distance threshold value. Alternatively or additionally, the driver assistance device can be configured to first check whether the motor vehicle can be returned in an automated manner on the driving trajectory of the return driving maneuver proceeding from the respective surrounding position when the distance is greater than the first distance threshold value (and less than the second distance threshold value).

In the event of a relatively small deviation from the driving trajectory of the return driving maneuver, it can therefore be presumed efficiently that the return driving maneuver can still be executed in an automated manner. The availability of the automated performance of the return driving maneuver can thus be further increased in an efficient manner.

The driver assistance device can be configured to detect a user input with respect to the acceptance of the output offer (by the user, in particular by the driver, of the motor vehicle). In reaction to the user input, it is possible to cause the motor vehicle to be returned in an automated manner, in particular along the (previously ascertained) return trajectory up to an intermediate position on the driving trajectory of the return driving maneuver. The longitudinal guidance of the motor vehicle can be effectuated manually by the driver of the motor vehicle. On the other hand, the lateral guidance of the motor vehicle can be effectuated in an automated manner by the motor vehicle.

Furthermore, it is possible to cause the recorded driving maneuver to be performed in an automated manner proceeding from the intermediate position. A particularly robust and reliable performance of the return driving maneuver can thus be effectuated.

The driver assistance device can be configured in this case such that the lateral guidance of the motor vehicle in the performance of the return driving maneuver is effectuated in an automated manner by the motor vehicle. On the other hand, it can be necessary for the longitudinal guidance of the motor vehicle in the performance of the return driving maneuver to be manually effectuated by the driver of the motor vehicle.

As already described, the driver assistance device can be configured, at an individual surrounding position (for example at each of the individual surrounding positions of a sequence of surrounding positions on an (actually driven) trajectory)

to ascertain the distance of the respective surrounding position from the driving trajectory of the return driving maneuver and to compare it to the (first and/or second) distance threshold value; and/or to check whether the motor vehicle can be returned (along a return trajectory) on the driving trajectory of the return driving maneuver proceeding from the respective surrounding position.

Based thereon, an offer for the performance of the return driving maneuver can then be output or suppressed at the respective surrounding position.

It can occur that the motor vehicle (for example after aborting the automated performance of the return driving maneuver) comes to a standstill at a surrounding position which is spaced apart from the driving trajectory of the return driving maneuver. The aspects described in this document can also be applied (in particular for such a situation) individually or in combination to an individual surrounding position (without reference to a manual driving trajectory).

According to one aspect, a further driver assistance device for assistance in the performance of a return driving maneuver of a motor vehicle based on a corresponding recorded outward driving maneuver is therefore described. The aspects described in this document (in particular those which relate to a specific surrounding position of the motor vehicle) are also applicable individually and in combination for this driver assistance device.

The driver assistance device can be configured to detect that the motor vehicle (due to an automated or manual journey) is arranged at a surrounding position in the surroundings of the driving trajectory of the return driving maneuver (for example because the distance from the driving trajectory of the return driving maneuver is equal to or less than the second distance threshold value). In particular, the driver assistance device can be configured to detect that the motor vehicle has deviated from the driving trajectory of the return driving maneuver and is now arranged at a surrounding position in the surroundings of the driving trajectory of the return driving maneuver.

The driver assistance device can furthermore be configured to check whether the motor vehicle can be returned in an automated manner on the driving trajectory of the return driving maneuver proceeding from the surrounding position. For this purpose, it can be checked whether or not a (valid) return trajectory can be ascertained.

The driver assistance device can furthermore be configured to output (in particular to maintain) an offer for an automated performance of the return driving maneuver at the surrounding position when it is ascertained that the motor vehicle can be returned from the surrounding position in an automated manner on the driving trajectory of the return driving maneuver.

The driver assistance device can be configured to detect that the motor vehicle has deviated from the driving trajectory of the return driving maneuver during an automated performance of the return driving maneuver (which was begun, for example, at the beginning of the driving trajectory of the return driving maneuver), and the automated performance of the return driving maneuver is or was aborted at the surrounding position in the surroundings of the driving trajectory of the return driving maneuver, in particular by the driver of the motor vehicle.

An offer for the continuation of the automated performance of the return driving maneuver at the surrounding position can then be output if it is ascertained that the motor vehicle can be returned in an automated manner on the driving trajectory of the return driving maneuver from the surrounding position (at which the automated performance of the return driving maneuver was aborted). The availability and the robustness of the automated performance of a return driving maneuver can thus be further increased.

According to a further aspect, a (road) motor vehicle (in particular a passenger vehicle or a truck or a bus or a motorcycle) is described, which comprises at least one of the driver assistance devices described in this document.

According to a further aspect, a method is described for assisting (a user, in particular the driver) in the performance of a return driving maneuver of a motor vehicle based on a corresponding recorded outward driving maneuver. The method comprises detecting that the motor vehicle is being guided manually along a manual trajectory in the surroundings of a driving trajectory of the return driving maneuver. Furthermore, the method comprises checking at individual surrounding positions of a sequence of surrounding positions along the manual trajectory whether (or not) the motor vehicle can be guided in an automated manner on the driving trajectory of the return driving maneuver proceeding from the respective surrounding position. In addition, the method comprises outputting (in particular maintaining) an offer for an automated performance of the return driving maneuver at a surrounding position of the sequence of surrounding positions when it is ascertained that the motor vehicle can be guided in an automated manner on the driving trajectory of the return driving maneuver from the surrounding position.

According to a further aspect, a further method for assisting in the performance of a return driving maneuver of a motor vehicle based on a corresponding recorded outward driving maneuver is described. The method comprises detecting that the motor vehicle has deviated from the driving trajectory of the return driving maneuver and now is arranged at a surrounding position in the surroundings of the driving trajectory of the return driving maneuver (i.e., spaced apart from the driving trajectory of the return driving maneuver). Furthermore, the method comprises checking whether the motor vehicle can be returned in an automated manner (with automated lateral guidance and possibly with manual longitudinal guidance) on the driving trajectory of the return driving maneuver proceeding from the surrounding position. The method furthermore comprises outputting (in particular maintaining) an offer for an automated performance of the return driving maneuver at the surrounding position when it is ascertained that the motor vehicle can be returned in an automated manner (with automated lateral guidance and possibly with manual longitudinal guidance) on the driving trajectory of the return driving maneuver from the surrounding position.

According to a further aspect, a software (SW) program is described. The SW program can be configured to be executed on a processor (for example on a control unit of a vehicle), and to thus carry out one or more of the methods described in this document.

According to a further aspect, a storage medium is described. The storage medium can comprise an SW program, which is configured to be executed on a processor, and to thus carry out one or more of the methods described in this document.

It is to be noted that the methods, devices, and systems described in this document can be used both alone and in combination with other methods, devices, and systems described in this document. Furthermore, any aspects of the methods, devices, and systems described in this document can be combined with one another in a variety of ways. In particular, the features of the claims can be combined with one another in a variety of ways. Furthermore, features set forth between parentheses are to be understood as optional features.

The invention is described in more detail hereinafter on the basis of exemplary embodiments.

Other objects, advantages and novel features of the present disclosure will become apparent from the following detailed description of one or more preferred embodiments when considered in conjunction with the accompanying drawings.

DETAILED DESCRIPTION OF THE DRAWINGS

Figure 1:
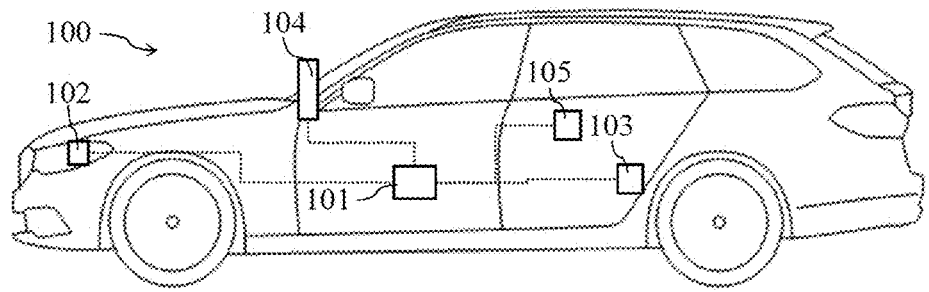
FIG. 1 shows exemplary components of a vehicle.

As described at the outset, the present document relates to increasing the convenience of a user of a vehicle in the performance of a driving maneuver, in particular a maneuvering maneuver, based on a previously recorded driving maneuver. In this context, FIG. 1 shows an exemplary vehicle 100 having one or more surroundings sensors 102 (e.g., at least one camera, at least one radar sensor, at least one lidar sensor, at least one ultrasonic sensor, etc.), which are each configured to acquire surroundings data (i.e. sensor data) with respect to the surroundings of the motor vehicle 100. A control device 101 of the vehicle 100 can be configured to evaluate the surroundings data in order to detect one or more objects in the surroundings of the vehicle 100.

The device 101 can furthermore be configured to operate one or more longitudinal and/or lateral guidance actuators 103 of the vehicle 100 (e.g., a drive motor, a braking device, and/or a steering device) in order to longitudinally and/or laterally guide the vehicle 100 in an automated manner. The one or more actuators 103 can be operated depending on the surroundings data, in particular depending on the one or more detected objects.

The vehicle 100 can furthermore comprise a user interface 104, which enables an interaction between the user and the vehicle 100, for example, to activate or deactivate a driver assistance function and/or to inform the user about the status of a driver assistance function. The user interface 104 can comprise one or more operating elements and/or one or more output elements (such as a display screen).

The vehicle 100 can have a driver assistance system or a driver assistance device, which is designed to record a driving trajectory traveled by the vehicle 100. The driving trajectory can be traveled manually by the driver of the vehicle 100 and/or in an automated manner by the vehicle 100. Trajectory data with respect to the driving trajectory can be stored in a storage unit 105 of the vehicle 100. The trajectory data can be ascertained on the basis of the sensor data from one or more sensors 102 of the vehicle 100. Exemplary sensors 102 are: one or more surroundings cameras, a position sensor (such as a receiver of a global navigation satellite system (GNSS)), a speed sensor, a steering sensor, etc. The trajectory data can specify for each of a plurality of positions (i.e. points) along the driving trajectory coordinates of the respective position (for example relative to a world coordinate system and/or relative to a coordinate system of the vehicle 100), which can be ascertained, for example, on the basis of a GNSS sensor of the vehicle 100;

the orientation and/or alignment of the vehicle 100 at the respective position; and/or the driving speed of the vehicle 100 at the respective position.

The recording of a driving trajectory can be explicitly started and/or stopped by the user of the vehicle 100 (via the user interface 104). The starting position and/or the end position of the stored driving trajectory can thus be defined in a precise manner. On the other hand, the driver assistance device can possibly be designed to automatically record the last driven x meters of the vehicle 100 in each case (for example with x≥10 or x≥40 or x≥50). These last driven x meters are then available at the end position of an outward driving maneuver as the recorded driving trajectory, in order to be able to perform a corresponding return driving maneuver based thereon.

Figure 2A:
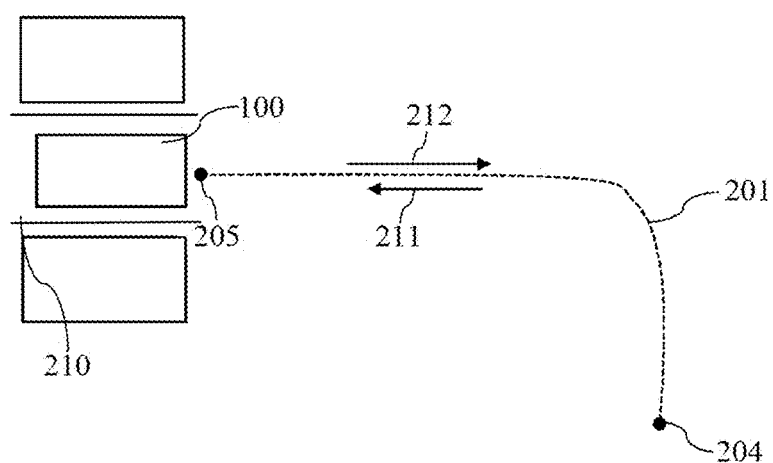
FIG. 2a shows an exemplary driving trajectory for a recorded driving maneuver, in particular for a parking maneuver.

FIG. 2a shows an exemplary driving situation, in which the vehicle 100 is driven along a driving trajectory 201 toward a parking space 210, wherein the parking space 210 can be arranged, for example, between two marking lines (markings in general) and/or between two obstacles (for example between two other vehicles). The driver of the vehicle 100 can start the recording of the driving trajectory 201 at the starting position 204 (for example by actuating an operating element of the user interface 104). Alternatively, an automatic recording of the driving trajectory 201 can be effectuated. In this case, for example, the last x meters of the driving trajectory 201 (for example x between 50 and 100) can be automatically recorded in each case. This can take place in particular when the recorded trajectory 201 is to be used for a subsequent return driving maneuver (in the reverse direction).

The driver can longitudinally and/or laterally guide the vehicle 100 manually to an end position 205 on the parking place 210. The path covered by the vehicle 100 from the starting position 204 to the end position 205 can be recorded as the driving trajectory 201 and possibly stored in the storage unit 105 of the vehicle 100. In particular trajectory data with respect to the driving trajectory 201 can be stored in the storage unit 105 of the vehicle 100.

The trajectory data can be used for a renewed performance of the recorded driving maneuver, in particular the parking maneuver for parking the vehicle 100 on the parking place 210. For example, an offer for the renewed performance of the recorded driving maneuver (along the outward direction 211) can be output to the driver of the vehicle 100 upon or before reaching the starting position 204 via the user interface 104. The user can accept this offer (for example by actuating an operating element of the user interface 104). As a result thereof, an automated longitudinal and/or lateral guidance of the vehicle 100 is effectuated on the basis of the trajectory data, by which the vehicle 100 is guided along the previously recorded driving trajectory 201 (along the outward direction 211) up to the end position 205 on the parking place 210.

Alternatively or additionally, the trajectory data for the recorded driving maneuver can be used to effectuate an automated journey of the vehicle 100 in the reverse direction (i.e. along the return direction 212), from the end position 205 to the starting position 204, in particular to drive the vehicle 100 out of the parking place 210. The driving trajectory used for the return journey along the return direction can possibly deviate from the trajectory 201 which was recorded for the outward journey along the outward direction. The driving trajectory used for the return journey is typically calculated directly from the trajectory data for the recorded trajectory 201, however.

In this document, reference is made to a driving trajectory 201 for a recorded driving maneuver (for example for an outward driving maneuver). This driving trajectory 201 can correspond to the driving trajectory recorded on the outward journey. On the other hand, this driving trajectory 201 can correspond to a trajectory ascertained for the return journey. The trajectory data can have been recorded during an outward driving maneuver. A return driving maneuver (from the end position 205 to the starting position 204) can be carried out on the basis of the recorded outward driving maneuver.

Figure 2B:
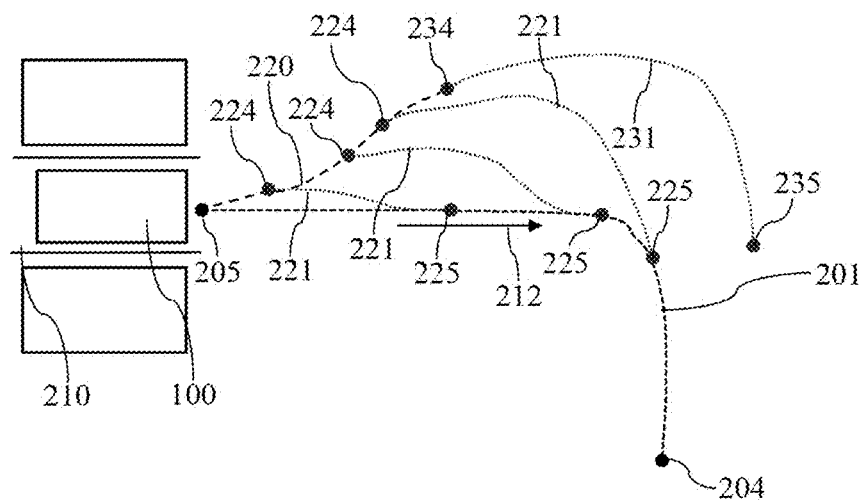
FIG. 2b shows exemplary return trajectories for returning the vehicle to the trajectory of the recorded driving maneuver.

FIG. 2b shows a driving situation in which the vehicle 100 is arranged in the direct surroundings of a return driving maneuver and in particular the driving trajectory 201 for the return driving maneuver. The vehicle 100 is longitudinally and/or laterally guided here manually by the driver of the vehicle 100 along a driving trajectory 220, which is referred to in this document as the manual driving trajectory (in general as the actually driven trajectory, or trajectory in short) 220. It can be recognized here that the vehicle 100 is driven manually along the return direction 212, which is opposite to the outward direction 211 of the recorded outward driving maneuver. It can possibly furthermore be recognized that the vehicle 100 is driven in reverse (while the vehicle 100 was driven forward in the recorded outward driving maneuver).

The device 101 can be configured to check at a sequence of positions 224, 234 on the manual driving trajectory 220 whether the respective position 224, 234 has a distance to the trajectory 201 of the return driving maneuver which is equal to or less than a predefined (first) distance threshold value. The distance can be observed along the perpendicular straight line from the respective position 224, 234 to the trajectory 201 of the return driving maneuver (i.e. the perpendicular distance) in each case.

The device 101 can be configured to output an offer for the performance of the return driving maneuver as long as the ascertained distance of the respective current position 224, 234 of the vehicle 100 is equal to or less than the (first) distance threshold value. The output of the offer can be suppressed as soon as the ascertained distance of the respective current position 224, 234 of the vehicle 100 is greater than the (first) distance threshold value.

If a predefined (first) distance threshold value is used, a relatively small distance threshold value is typically used to increase the robustness of the driver assistance in order to ensure that the automated driving maneuver can also actually be performed proceeding from the respective position 224, 234. The use of a relatively small (first) distance threshold value typically results in a relatively low availability of the offer to perform the return driving maneuver.

The driver can be driven manually, proceeding from the end position 205, along the manual driving trajectory 220. The vehicle 100 can have been guided away from the driving trajectory 201 for the return driving maneuver.

The device 101 can be configured, in each case at the sequence of (surrounding) positions 224, 234 along the manual driving trajectory 220, to plan a return trajectory 221, by which the vehicle 100 can be returned in an automated manner to the driving trajectory 201 of the return driving maneuver, in particular to an intermediate position 225 on the driving trajectory 201 of the return driving maneuver. The return trajectory 221 can be ascertained in each case on the basis of the surroundings data of the one or more surroundings sensors 102 of the vehicle 100. Furthermore, the orientation of the vehicle 100 at the respective (surrounding) position 224, 234 can be taken into consideration.

It can then be checked at the respective (surrounding) position 224, 234 whether a return trajectory 221 can be ascertained by which the vehicle 100 can be longitudinally and/or laterally guided in an automated manner back on the driving trajectory 201 of the return driving maneuver. The output of the offer for performing the recorded return driving maneuver can be effectuated and/or maintained as long as such a (valid) return trajectory 221 can be ascertained.

If (in particular as soon as) no such (valid) return trajectory 221 can still be ascertained at a (surrounding) position 234 on the manual driving trajectory 220 (for example because the trajectory 231 which can be ascertained does not lead to a point 235 which lies on the driving trajectory 201 of the return driving maneuver), the output of the offer for the performance of the return driving maneuver can be suppressed at (in particular from) this (surrounding) position 234.

It can thus be checked (also during manual operation of the vehicle 100) whether, proceeding from the respective (surrounding) position 224, 234 of the vehicle 100, an automated return (at least with automated lateral guidance) to the driving trajectory 201 of the return driving maneuver is possible or not. The robustness and the availability of the performance of a return driving maneuver can thus be increased in a reliable manner.

Figure 2C:
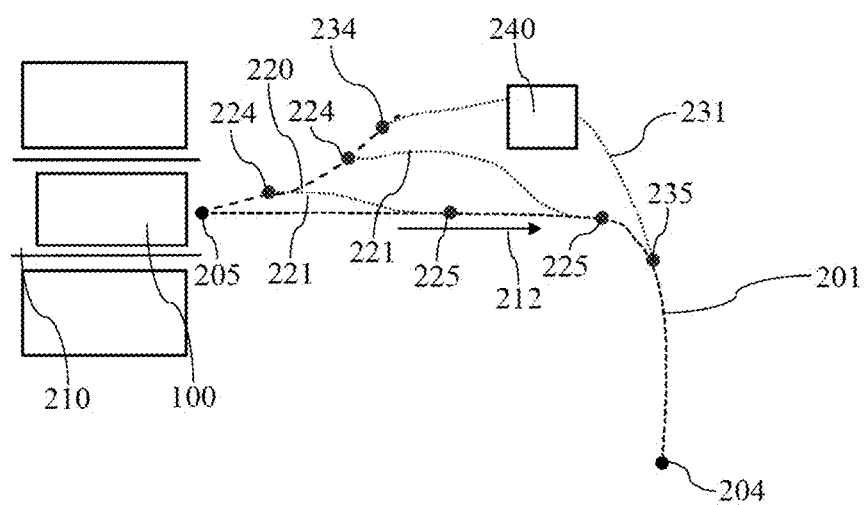
FIG. 2c shows an exemplary obstacle on a return trajectory.

In the ascertainment of the return trajectories 221, objects, in particular obstacles, 240 in the surroundings of the vehicle 100 can also be taken into consideration, as shown by way of example in FIG. 2c. In particular, it can be checked whether an object 240 is arranged on the ascertained return trajectory 221. If this is the case, this return trajectory 221 can be discarded and it can possibly be decided that no suitable (valid) return trajectory 221 can be ascertained.

Figure 2D:
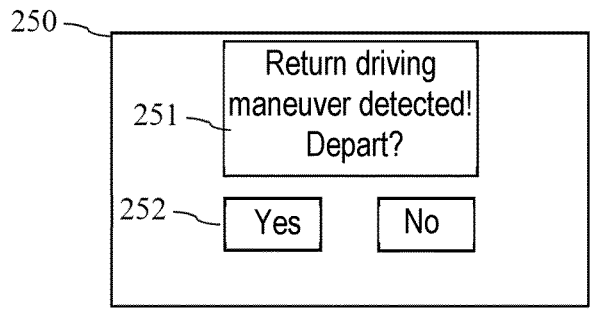
FIG. 2d shows an exemplary offer to perform a recorded driving maneuver.

FIG. 2d shows an exemplary output 250 having an offer 251 to perform a return driving maneuver and having a query 252 as to whether the return driving maneuver is to be performed in an automated manner or not.

By way of the measures described in this document, the corridor of a passive abort criterion in the event of deviation from a specified path 201 can be expanded, even if no active performance of a return driving maneuver for a previously recorded outward driving maneuver takes place. Rather, a passive performance of the return driving maneuver can be effectuated and when a deviation from the originally recorded path 201 is present, it can be checked on the basis of the function logic, inter alia, with the aid of the sensor system 102 for surroundings detection whether the original path 201 can be reached again (by a return trajectory 221). It can be checked here proceeding from the current vehicle position 224, 234 whether a path 221 back can be planned with the maximum implementable driving path curvature. Furthermore, it can be checked using the surroundings detection that no object 240 blocks the way on this path 221. If both checks are positive, the function offer 251 can be maintained and if the function is actually activated, it is possible to drive back as quickly as possible on the original path 201 (along a return trajectory 221).

In the active check of the availability of a return trajectory 221, a second distance threshold value for the maximum permissible distance to the trajectory 201 of the return driving maneuver can possibly be taken into consideration, wherein the second distance threshold value can be greater than the above-mentioned first distance threshold value. The check of the availability of a return trajectory 221 can possibly only be carried out if the distance is equal to or less than the second distance threshold value. Otherwise, the output of an offer 251 to perform the return driving maneuver can possibly be fundamentally suppressed. The robustness of the performance of the return driving maneuver can thus be further increased.

As already described above, one or more boundary conditions can be taken into consideration in the ascertainment of a return trajectory 221. Exemplary boundary conditions are
- a condition to the effect that no object 240 is arranged on the return trajectory 221; and/or
- a condition to the effect that the return trajectory 221 does not have a maximum permissible distance to the trajectory 201 of the return driving maneuver at any point (wherein the maximum permissible distance can be equal to or greater than the second distance threshold value).

The robustness of the performance of the automated driving maneuver can thus be further increased.

Figure 3:
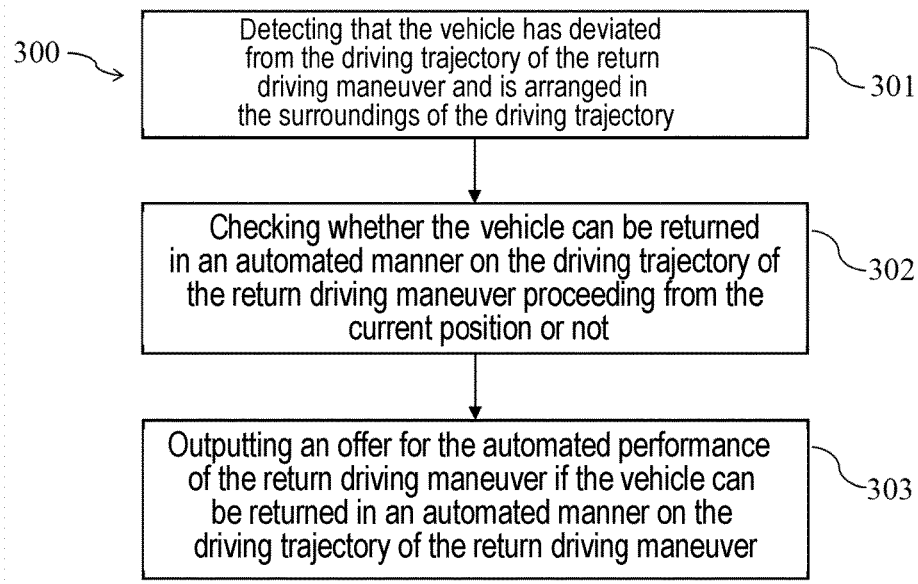
FIG. 3 shows a flow chart of an exemplary method for assistance in the performance of a return driving maneuver.

FIG. 3 shows a flow chart of a (possibly computer-implemented) method 300 for assistance in the performance of a return driving maneuver of a motor vehicle 100. The return driving maneuver can correspond here to a previously recorded outward driving maneuver. The driving trajectory 201 for the return driving maneuver can be ascertained on the basis of the recorded trajectory of the outward driving maneuver.

The method 300 comprises detecting 301 that the motor vehicle 100 has deviated from the driving trajectory 201 of the return driving maneuver, and is now arranged at a surrounding position 224, 234 in the surroundings of the driving trajectory 201 of the return driving maneuver. The motor vehicle 100 can have been manually guided along a manual trajectory 220. The motor vehicle 100 can have been guided along the return direction 212 (wherein the outward driving maneuver was carried out in the outward direction 211).

The surroundings of the driving trajectory 201 can be defined, for example, on the basis of a specific (second) distance threshold value. It can be determined that the motor vehicle 100 is located in the surroundings of the driving trajectory 201 of the return driving maneuver, if, in particular as long as, the distance (in particular the perpendicular distance) of the motor vehicle 100 to the driving trajectory 201 of the return driving maneuver is equal to or less than the (second) distance threshold value. On the other hand, it can be determined that the motor vehicle 100 is not located in the surroundings of the driving trajectory 201 of the return driving maneuver if, in particular as soon as, the distance (in particular the perpendicular distance) of the motor vehicle 100 to the driving trajectory 201 of the return driving maneuver is greater than the (second) distance threshold value. The detection 301 can be effectuated on the basis of the surroundings data of the one or more surroundings sensors 102 of the motor vehicle 100.

The method 300 furthermore comprises checking 302 whether the motor vehicle 100 can be returned in an automated manner on the driving trajectory 201 of the return driving maneuver or not proceeding from the surrounding position 224, 234. For this purpose, it can be checked whether (or not) a (valid) return trajectory 221 to the driving trajectory 201 of the return driving maneuver can be ascertained proceeding from the surrounding position 224, 234, which meets one or more boundary conditions (for example with respect to the maximum permissible curvature and/or with respect to the maximum permissible distance to the driving trajectory 201 of the recorded driving maneuver).

Furthermore, the method 300 comprises outputting (in particular maintaining) 303 an offer 251 for an automated performance of the return driving maneuver at the surrounding position 224, 234 when it is ascertained that the motor vehicle 100 can be guided from the surrounding position 224, 234 in an automated manner to the driving trajectory 201 of the return driving maneuver. The offer 251 can be output during the journey of the motor vehicle 100 along the manual trajectory 220, as long as it is ascertained that the motor vehicle 100 can be guided (back) from the respective surrounding position 224, 234 on the manual trajectory 220 in an automated manner (along an ascertained (valid) return trajectory 221) on the driving trajectory 201 of the return driving maneuver. On the other hand, the offer 251 can be suppressed if, in particular as soon as, it is ascertained that the motor vehicle 100 can no longer be guided (back) from the respective surrounding position 224, 234 in an automated manner (along a return trajectory 221 which meets one or more boundary conditions) on the driving trajectory 201 of the return driving maneuver.

Figure 4:
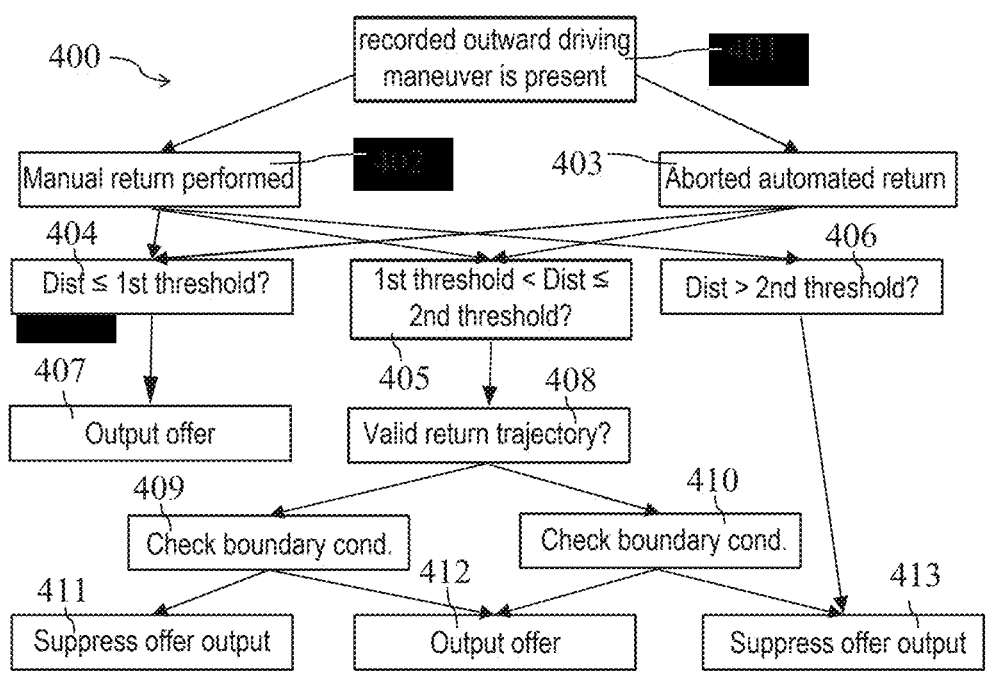
FIG. 4 shows an exemplary decision tree for the output of an offer for the automated performance of a return driving maneuver.

FIG. 4 shows a decision diagram 400, which can be used by the device 101 to decide about whether an offer to perform the return driving maneuver is output (in particular maintained) or not. The decision diagram 400 shows possible transitions (i.e. arrows) between different nodes (for example states).

It can be established (node 401) that a recorded outward driving maneuver is present, for which a corresponding return driving maneuver could be performed in an automated manner. It can be distinguished whether a manual return drive of the vehicle 100 (along the return direction 212) is performed (node 402) or whether an automated performance of the return driving maneuver was already carried out, which was aborted (node 403), however (by the driver or by the driver assistance device 101), so that the vehicle 100 is arranged at a (surrounding) position 224, 234, which does not lie on the driving trajectory 201 of the return driving maneuver.

As already described, different cases can be distinguished (with respect to the respective current (surrounding) position 224, 234 of the vehicle 100).
- node 404: the distance of the vehicle 100 to the driving trajectory 201 of the return driving maneuver is equal to or less than the first distance threshold value; in this case an output of the offer to perform the return driving maneuver can fundamentally be effectuated, in particular maintained (node 407);
- node 405: the distance of the vehicle 100 to the driving trajectory 201 of the return driving maneuver is greater than the first distance threshold value and equal to or less than the second distance threshold value; in this case it can be checked whether a valid return trajectory 221 can be ascertained (node 408). One or more boundary conditions can be checked (nodes 409, 410). If no valid return trajectory 221 can be ascertained, the output of the offer to perform the return driving maneuver can be suppressed (for example ended) (node 411, 413). On the other hand, if a valid return trajectory 221 can be ascertained, the output of the offer to perform the return driving maneuver can be effectuated (in particular maintained) (node 412).

Node 406: the distance of the vehicle 100 to the driving trajectory 201 of the return driving maneuver is greater than the second distance threshold value; in this case, the output of the offer to perform the return driving maneuver can (fundamentally) be suppressed (nodes 411, 413), possibly independently of whether a valid return trajectory 221 could be ascertained.

The convenience of a user in performing a return driving maneuver can be increased in an efficient and reliable manner by the aspects described in this document.

The present invention is not restricted to the exemplary embodiments shown. In particular, it is to be noted that the description and the figures are only to illustrate the principle of the proposed methods, devices, and systems by way of example.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A driver assistance device for assistance in performance of a return driving maneuver of a motor vehicle based on a corresponding recorded outward driving maneuver, wherein the driver assistance device is configured to:
   detect that the motor vehicle has been operated at least partially manually by a driver along an actually driven trajectory that started on a return driving maneuver driving trajectory and has deviated from the return driving maneuver driving trajectory and that the motor vehicle has become arranged at a first surrounding position in surroundings of the return driving maneuver driving trajectory, wherein a distance of the first surrounding position from the return driving maneuver driving trajectory is greater than a first distance threshold value;
   determine that the motor vehicle is returnable in an automated manner on a return trajectory from the first surrounding position to an intermediate position on the return driving maneuver driving trajectory;
   output an offer for an automated performance of the return driving maneuver at the first surrounding position in response to determining that the motor vehicle is returnable from the first surrounding position in the automated manner on the return driving maneuver driving trajectory;
   detect a user input indicating an acceptance of the offer; and
   responsively perform automated lateral guidance of the motor vehicle along the return trajectory to an intermediate position on the return driving maneuver driving trajectory, and continue to perform automated lateral guidance of the motor vehicle along the return driving maneuver driving trajectory from the intermediate position.

2. The driver assistance device according to claim 1, wherein the driver assistance device is configured to:
   iteratively repeat the process of determining that the motor vehicle is returnable in an automated manner and outputting the offer for a sequence of a plurality of individual surrounding positions.

3. The driver assistance device according to claim 1, wherein the driver assistance device is configured to:
   ascertain the return trajectory that meets one or more boundary conditions,
   wherein the one or more boundary conditions comprise:
       a boundary condition to an effect that no object obstructing the motor vehicle is arranged on the return trajectory;
       a boundary condition to an effect that the return trajectory does not deviate by more than a maximum permissible distance from the return driving maneuver driving trajectory at any point; and/or
       a boundary condition to an effect that the return trajectory does not exceed a maximum curvature at any point.

4. The driver assistance device according to claim 1, wherein the driver assistance device is configured to:
   determine that the motor vehicle is returnable in the automated manner in an absence of activation of automated driver assistance for performing the return driving maneuver, and/or in an absence of a user input for activating the determining previously having taken place.

5. The driver assistance device according to claim 1, wherein the driver assistance device is configured to:
   for a second surrounding position different from the first surrounding position:
       determine that the motor vehicle is not returnable in an automated manner on a return trajectory from the second surrounding position to an intermediate position on the return driving maneuver driving trajectory; and
       responsively suppress the offer for the automated performance of the return driving maneuver from the second surrounding position.

6. The driver assistance device according to claim 1, wherein the driver assistance device is configured to:
   for a second surrounding position on the actually driven trajectory that is different from the first surrounding position:
       ascertain a second distance of the second surrounding position from the return driving maneuver driving trajectory;
       compare the second distance to the first distance threshold value; and
       in response to the second distance being equal to or less than the first distance threshold value:
           output the offer for the automated performance of the return driving maneuver at the second surrounding position without previously determining that the motor vehicle is returnable in an automated manner to the return driving maneuver driving trajectory from the second surrounding position; and/or
           suppress the determining that the motor vehicle is returnable in an automated manner to the return driving maneuver driving trajectory from the second surrounding position.

7. The driver assistance device according to claim 1, wherein the driver assistance device is configured to:
   for a second surrounding position on the actually driven trajectory that is different from the first surrounding position:
       ascertain a second distance of the second surrounding position from the return driving maneuver driving trajectory;

compare the second distance to a second distance threshold value that is greater than the first distance threshold; and in response to the second distance being greater than the second distance threshold value:
determine that the motor vehicle is no longer arranged in the surroundings of the return driving maneuver driving trajectory; and/or
suppress the offer for the automated performance of the return driving maneuver from the second surrounding position.

8. The driver assistance device according to claim 1, wherein, during the performance of the automated lateral guidance of the motor vehicle, a longitudinal guidance of the motor vehicle is manually effectuated by a driver of the motor vehicle.

9. The driver assistance device according to claim 1, wherein the recorded outward driving maneuver comprises an outward journey driven in a forward direction from a starting position to an end position, and
wherein performing the automated lateral guidance comprises performing a corresponding return journey driven in a reverse direction from the end position toward the starting position.

10. The driver assistance device according to claim 9, wherein the driver assistance device is configured to:
ascertain the return driving maneuver driving trajectory on a basis of a driving trajectory recorded for the outward driving maneuver and/or during the outward driving maneuver.

11. A method for assistance in performance of a return driving maneuver of a motor vehicle based on a corresponding recorded outward driving maneuver, the method comprising:

detecting that the motor vehicle has been operated at least partially manually by a driver along an actually driven trajectory that started on a return driving maneuver driving trajectory and has deviated from the return driving maneuver driving trajectory and that the motor vehicle has become arranged at a surrounding position in surroundings of the return driving maneuver driving trajectory, wherein a distance of the surrounding position from the return driving maneuver driving trajectory is greater than a first distance threshold value;

determining that the motor vehicle is returnable in an automated manner on a return trajectory from the first surrounding position to an intermediate position on the return driving maneuver driving trajectory;

outputting an offer for an automated performance of the return driving maneuver at the surrounding position in response to determining that the motor vehicle is returnable from the surrounding position in the automated manner on the return driving maneuver driving trajectory;

detecting a user input indicating an acceptance of the offer; and responsively performing automated lateral guidance of the motor vehicle along the return trajectory to an intermediate position on the return driving maneuver driving trajectory, and continuing to perform automated lateral guidance of the motor vehicle along the return driving maneuver driving trajectory from the intermediate position.

\* \* \* \* \*